United States Patent [19]
Essop

[11] Patent Number: 5,091,088
[45] Date of Patent: Feb. 25, 1992

[54] LIQUID SEPARATING APPARATUS

[76] Inventor: Saleam Essop, 97 Sir Kurma Reddi Rd., Natal, South Africa

[21] Appl. No.: 497,542

[22] Filed: Mar. 21, 1990

[30] Foreign Application Priority Data

Mar. 22, 1989 [ZA] South Africa .................. 89/2718

[51] Int. Cl.$^5$ .................. B01D 17/02; B01D 17/025; B01D 17/04
[52] U.S. Cl. .................. 210/536; 210/532.1; 210/533; 210/513; 210/519; 210/257.1
[58] Field of Search .................. 210/513, 521, 532.1, 210/533, 536, 800, 801, 802, 519, 803, 257.1, 515, 538

[56] References Cited
U.S. PATENT DOCUMENTS 3,804,252  4/1974  Rishel .................. 210/532.1
4,111,805  9/1978  Van Pool et al. .................. 210/532.1
4,257,895  3/1981  Murdock .................. 210/532.1

Primary Examiner—Stanley S. Silverman
Assistant Examiner—Neil M. McCarthy
Attorney, Agent, or Firm—Bierman and Muserlian

[57] ABSTRACT

A liquid separating apparatus is provided for separating a liquid mixture into its immiscible constituents of different densities. The apparatus includes a separating tank (12) in communication with a discharge tank (18). The separating tank (12) has an inlet for introducing the mixture to the apparatus and a first outlet (16) for the mixture constituent of lower density. The discharge tank (18) has a second outlet (20) for the mixture constituent of higher density. The relative levels of the first and second outlets are higher than the mixture inlet, the first outlet (16) being at a higher level than the second outlet. A communication passage is provided between the separating tank (12) and the discharge tank (18) through a base of the apparatus.

3 Claims, 1 Drawing Sheet

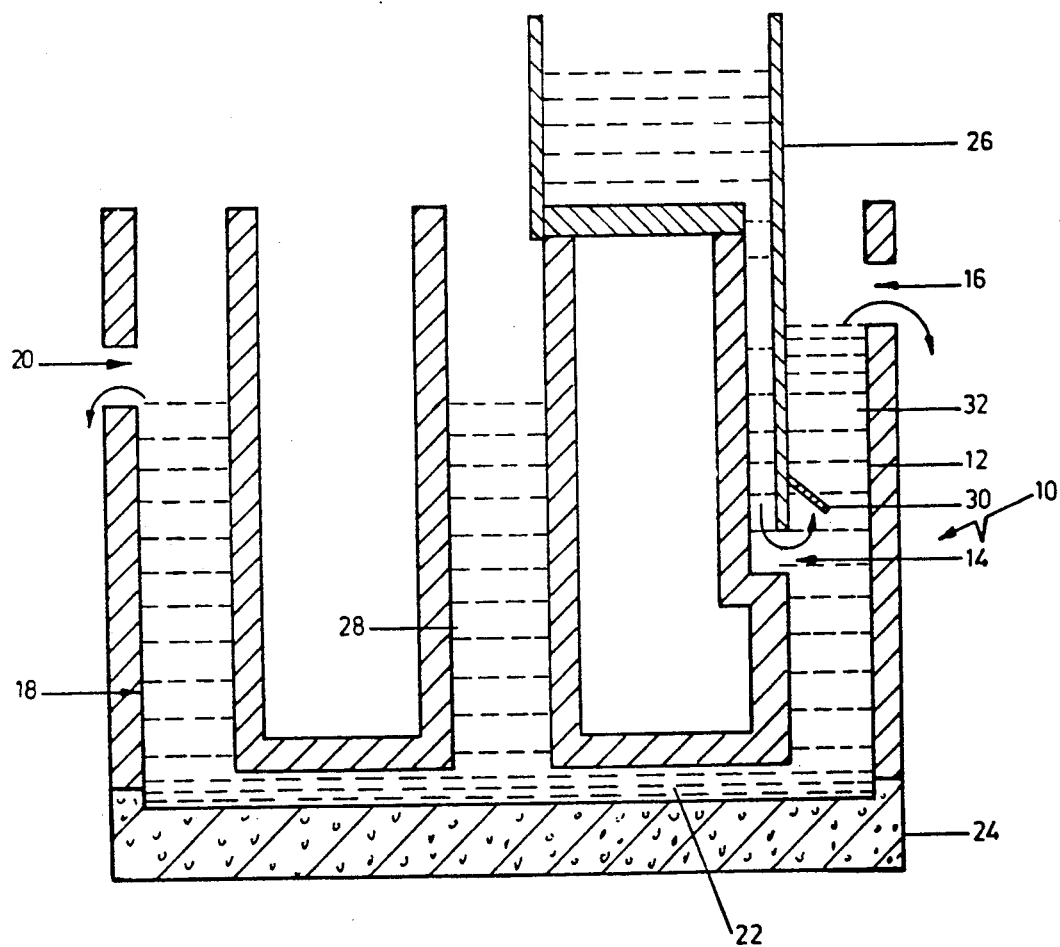

LIQUID SEPARATING APPARATUS

This invention relates to a liquid separating apparatus and a method thereof.

More particularly, this invention relates to a liquid separating apparatus and a method for separating into constituents, a mixture of two or more liquids insoluble in each other and having relatively different densities, such as, a mixture of oil and water.

According to this invention, there is provided a liquid separating apparatus for separating into its constituents, a mixture of at least two liquids insoluble in each other and of different densities, characterized in that the apparatus includes a separating tank provided with an inlet for introducing the mixture to the separating tank and a first outlet for the mixture constituent of a relatively low density;

a discharge tank provided with a second outlet for the mixture constituent of a relatively higher density; and a passage defining means defining a passage for providing communication between the said separating tank and the discharge tank;

the relative level of the second outlet being higher than the level of the mixture inlet but lower than the level of the first outlet, the relative level of the passage being below the levels of the outlets and the inlet.

Preferably, the separating tank and the discharge tank are columnar hollow structures.

Particularly, the separating tank and the discharge tank are cylindrical upright structures provided on a base and the passage means is provided through the base.

The liquid separating apparatus may further include a holding tank for holding the mixture, the holding tank being in communication with the mixture inlet of the separating tank.

The holding tank may be located at a relative level higher than the rest of the apparatus for permitting gravitational flow of the mixture from the holding tank to the separating tank.

The location and configuration of the outlets is such as to cope with the rate of flow of the mixture into the separating tank so that the rate of inflow of the mixture will be substantially equal to the combined rate of flow of the mixture constituents out of the outlets.

Valve formations may be provided at the inlet and the outlets for permitting adjustment of the rates of flow of the mixture into the separating tank and the respective rates of flow of the mixture constituent of different densities through the outlets.

The first and the second outlet may be aperture formations on the sides of the tanks.

Extension conduits may be provided at the aperture formation for leading the mixture constituents away from the apparatus.

The dimensions of the apertures, the relative levels of the apertures with respect to each other and with respect to the mixture inlet and the dimensions and directions of the extension conduits may be variable.

The liquid separating apparatus may include dispersing means for dispersing the molecules of the mixture constituents away from each other and preventing streaming of the mixture towards the first outlet.

The dispersing means may be in the form of a baffle plate defining a plurality of perforations located near the mixture inlet.

The dispersing means may further include an electrode connected to a high voltage source.

The apparatus may include an emulsion tank provided along the passage in communication with the separating tank and the discharge tank.

The emulsion tank may be advantageously provided to receive and contain any emulsion constituent of the mixture, in case the constituent of the mixture of liquids to be separated are colloidally suspendable in each other. In a preferred embodiment of the invention, the emulsion tank may be located between the separating tank and the discharge tank.

The separating tank, the discharge tank, the emulsion tank and the passage defining means may be of a suitable material and may be particularly made of a material resistant to the mixture or its constituents.

The invention also extends to a method of separating a mixture of at least two insoluble liquids into its constituents, which includes:

providing a separating tank having a mixture inlet and a first outlet, said separating tank being in communication with a discharge tank having a second outlet;

delivering the mixture to be separated to the said separating tank through the mixture inlet;

allowing the mixture constituent of lower density to build-up by flotation on the mixture constituent of higher density in the said separating tank, until the mixture constituent of lower density rises up to the said first outlet;

discharging the said mixture constituent of lower density through the said first outlet; and allowing the said mixture constituent of higher density to build-up in the said discharge tank and to be discharged through the said second outlet of the discharge tank.

In a preferred embodiment of the invention, the method further includes the step of delivering the mixture to a holding tank located at a level higher than the rest of the apparatus and allowing the mixture to be fed into the separating tank by gravity.

In a further embodiment, the method includes controlling the rate of inflow of the mixture and the rate of outflow of the mixture constituents so that the two flow rates are substantially the same.

In another embodiment of the invention, the method includes dispersing the molecules of the mixture constituents of the mixture away from each other by providing dispersing means in the separating tank.

In yet another embodiment of the invention, the method includes filling the separating tank and the discharge tank with the mixture constituents of higher density before commencement of the separating method, up to the level of the mixture inlet in the separating tank.

The mixture may particularly be a mixture of oil and water and particularly, oil contaminated with water and the invention extends to an apparatus for separating oil from water and a method therefor.

It must be appreciated that the apparatus of the invention may be provided in cascade manner so that the outflow from the first apparatus serves as an inflow for the subsequent apparatus and so on, thereby increasing the concentration of the separated constituents.

The invention will now be described, by way of an example, with reference to the accompanying drawing, which is a schematic sectional view of a liquid separating apparatus, according to this invention.

Referring to the drawing, a liquid separating apparatus in accordance with the invention is indicated generally by the reference numeral 10.

The liquid separating apparatus 10 can be used for separating into its constituents, a mixture of at least two liquids insoluble in each other, and of different densities. The apparatus 10 includes a separating tank 12 defining a liquid mixture inlet 14 and a first outlet 16 for the constituent of the mixture with relatively low density (such as for example, oil), a discharge tank 18 defining a second outlet 20 for the constituent of the mixture of a relatively higher density (such as for example. water) and a passage 22 providing communication between the separating tank 12 and the discharge tank 18.

The relative level of the second outlet 20 is higher than the level of the mixture inlet 14 but lower than the first outlet 16 and the relative level of the passage means 22 is below the levels of the outlets 16 and 20 and the inlets 14.

The separating tank 12 and the discharge tank 18 are columnar hollow structures and are preferably cylindrical and upright structures provided on a base 24 and the passage 22 is provided through the base 24.

The liquid separating apparatus 10 further includes a holding tank 26 for holding the mixture, the holding tank 26 being in communication with the mixture inlet 14 of the separating tank 12. The holding tank 26 is located at a relatively higher level than the rest of the apparatus 10 for permitting gravitational flow of the mixture from the holding tank 26 to the separating tank 12.

The location and the configuration of outlets 16 and 20 are such that the outlets are able to cope with the inflow of the mixture into the separating tank 12. The inflow rate is adjusted to be substantially equal to the combined rate of outflow of the constituents of the outlets 16 and 20. The first outlet 16 and the second outlet 20 define aperture formations on the sides of the tanks 12 and 18 respectively. The dimensions of the apertures and the relative levels of the apertures with respect to each other and with respect to the mixture inlet 14 is adjustable.

An emulsion tank 28 is provided along the passage 22 in communication with the separating tank 12 and the discharge tank 18. The emulsion tank 28 is advantageously provided to receive and contain the emulsion constituent of the mixture, in case the constituent of the mixture of liquids to be separated are colloidally suspendable in each other. Preferably, the emulsion tank is located between the separating tank 12 and the discharge tank 18.

Dispersing means in the form of a baffle plate 30 defining a plurality of perforations is provided in the separating tank 12, for dispersing the molecules of the low density mixture constituent away from the rest of the mixture for preventing streaming of the mixture towards the first outlet 16. The plate 30 is located near the mixture inlet 14.

The dispersing means can include an electrode (not shown) connected to a high voltage source.

The separating tank 12, the discharge tank 18, the emulsion tank 28 and the passage 22 are of suitable material and are particularly made of material resistant to the mixture or its constituents.

Valve formations (not shown) may be provided at the inlet and the outlets to adjust the rates of flow of the mixture into the separating tank 12 and the respective rates of flow of the liquids of different densities through the outlets 16 and 20.

In use, a mixture of liquids insoluble in each other, for instance, oil and water is pumped into holding tank 26 from which it flows by gravity towards the mixture inlet 14 of the separating tank 12. The tanks may be prefilled with water in a case where water is a liquid constituent with higher density. As the mixture enters the mixture inlet 14, it comes into contact with the baffle plate 30 which breaks up the stream of inflowing mixture and disperses the constituents. The lighter oil constituent of the mixture, rises to the top of a column of water 32 in the separating tank 12, while the water constituent seeks its own level in both the separating tank 12 and the discharge tank 18. Water flows out through the second outlet 20.

As soon as the, oil floating on water column 32 reaches the level of the first outlet 16, it starts to flow out through the outlet 16.

It is believed that the use of an electrode around the dispersal area of the constituents near the plate 30 will cause ionisation of the mixture and will accelerate the separation of the constituents in the separation of the constitutes in the separating tank 12.

The rate of inflow of mixture and the outflow of the constituents are controlled to ensure that the rate of inflow is substantially equal to the outflow and does not increase beyond the outflow rate as this will cause the water column in the separating tank 12 to eventually rise up to the first outlet 16.

Oil flowing out of the first outlet 16 may be cascaded into a further stage comprising a similar apparatus 10 through which the outlfow may be made to pass and which will increase the concentration of oil.

It must be appreciated that the apparatus according to the invention may be mounted on ships or derricks out at sea and therefore, may be particularly useful in recovering oil in the case of oil spills.

I claim:

1. A method of separating a mixture of at least two immiscible liquids of different densities and insoluble in each other into its constituents comprising introducing the said mixture into a separating tank having a mixture inlet and a first outlet, said separating tank being in communication by a communication passage with an emulsion tank between the separating tank and a discharge tank whereby emulsion constituent build-up in emulsion tank at the lowest level of both tanks; the discharge tank having a second outlet; the relative level of the second outlet being higher than the level of the mixture inlet but lower than the level of the first outlet, the relative level of the communication passage being below the levels of the two outlets and the inlet, delivering the mixture to be separated to the said separting tank through the said mixture inlet; allowing the mixture constituent of lower density to build-up by flotation on the mixture constitutes of higher density in the said separating tank, until the mixture constituent of lower density rises up to the first outlet and is discharged there through; and allowing the mixture constituents of higher density to build-up in the said discharge tank and to be discharged through the second outlet of the said discharge tank.

2. A method as claimed in claim 1, which includes a step of controlling the rate of inflow of the mixture and the rate of outflow of the mixture of constituents so that the two flow rates are substantially the same.

3. A method as claimed in claim 1, which includes a step of dispersing the molecules of the mixture constituents of the mixture away from each other by providing dispersing means in the said separating tank.

* * * * *